United States Patent [19]

Ott et al.

[11] Patent Number: 4,519,482

[45] Date of Patent: May 28, 1985

[54] WEDGE ACTUATED DRUM BRAKE ASSEMBLY

[75] Inventors: William E. Ott; Edwin A. Krieg, both of Elyria, Ohio

[73] Assignee: Allied Corporation, Morristown, N.J.

[21] Appl. No.: 345,970

[22] Filed: Feb. 5, 1982

[51] Int. Cl.$^3$ ............................................. F16D 51/62
[52] U.S. Cl. ................................... 188/343; 188/364; 74/110
[58] Field of Search ............... 188/343, 217, 216, 364; 74/110

[56] References Cited

U.S. PATENT DOCUMENTS 4,018,313 4/1977 Hart et al. ............................. 188/343

FOREIGN PATENT DOCUMENTS 1493384 11/1977 United Kingdom ................. 188/343

Primary Examiner—Duane A. Reger
Assistant Examiner—Alvin Oberley
Attorney, Agent, or Firm—Ken C. Decker; W. N. Antonis

[57] ABSTRACT

A wedge actuated drum brake assembly uses a wedge-shaped actuating rod and a roller cage slidably mounted thereon to transmit actuating forces from a fluid pressure actuator to a pair of friction elements. The actuating rod and roller cage are provided with a compression spring between the rod and the roller cage and an extension spring between the roller cage and the housing within which the actuating rod and roller cage are movably mounted. The extension spring opposes the compression spring during initial movement of the actuating rod to thereby cancel the spring forces acting on the cage. A flexible boot interconnects the rod and the wall of the housing and includes a bead that is clamped with the end coil of the extension spring between a shoulder on the housing and a portion of the fluid pressure actuator that extends into the housing.

7 Claims, 3 Drawing Figures

WEDGE ACTUATED DRUM BRAKE ASSEMBLY

This invention relates to a drum brake assembly having a wedge actuator for use particularly with heavy duty vehicles.

Wedge actuated drum brake assemblies have been known in the prior art. They are of the type having a drum mounted for rotation with a member to be braked, a fixed support non-rotatably mounted adjacent the drum, a pair of friction elements slidably mounted on said fixed support presenting opposite pairs of contiguous ends, and an actuator assembly between at least one of said pairs of contiguous ends of said friction elements for urging the latter into braking engagement with said drum when a brake application is effected, said actuator assembly including a housing mounted on said fixed support, a pair of pistons slidable in said housing, each of said pistons being operably connected to a corresponding one of said friction elements for urging the latter toward said drum, a force transmitting assembly movable relative to said housing and including a force transmitting member and a camming member slidable on said force transmitting member, said force transmitting assembly being movable between brake applied and brake released conditions for forcing said pistons toward and away from positions urging said friction elements against said drum when a brake application is effected, and resilient means yieldably urging said force transmitting assembly toward the brake released condition. Brakes of this type are disclosed in the prior art in U.S. Pat. No. 3,362,506 issued Jan. 9, 1968 to Mossey and U.S. Pat. No. 3,037,584 issued June, 1962 to Cox et al.

When designing a wedge actuated brake of this type, the designer is faced with conflicting problems. In order to fit the space available, the parts must often be made as small as possible, but if the parts are made too small, the actuating forces present during a brake application will destroy the parts. Furthermore, the wedge actuator must be able to move both in directions along the centerline of the actuator and also at right angles thereto for a fairly small distance. The springs commonly used in wedge actuators to return the wedge to the brake released condition have generally been capable only of movement along the centerline of the actuator and not perpendicular thereto. Furthermore, the actuator must be properly sealed to protect the latter from environmental contaminants, yet the seal must permit the required motion of the wedge actuator both along its centerline and at right angles thereto.

The wedge actuated drum brake assembly disclosed in this application is characterized in that the resilient means includes first spring means carried between said force transmitting member and said camming member for urging the latter toward a predetermined position with respect to the force transmitting member, said first spring means being movable with said force transmitting assembly, and second spring means between the first transmitting assembly and the wall of said housing. Accordingly, this invention provides a brake in which the highly stressed components of the actuator assembly disclosed herein are at least as large as equivalent components in the prior art, thereby spreading the braking stresses over a larger area to make failures of these highly stressed components less likely, but which has a smaller overall size. Another advantage of the present invention is that the return spring's arrangement accommodates movement of the wedge actuator both along its centerline and at right angles thereto. Still another advantage of this invention is that the forces applied to the roller cage and roller assembly by the wedge return springs cancel one another during initial movement of the wedge assembly so that the roller cage cannot move relative to the wedge because of the action of the return springs.

Other features and advantages of the present invention will appear in the following description with reference to the accompanying drawings in which.

Figure 1:
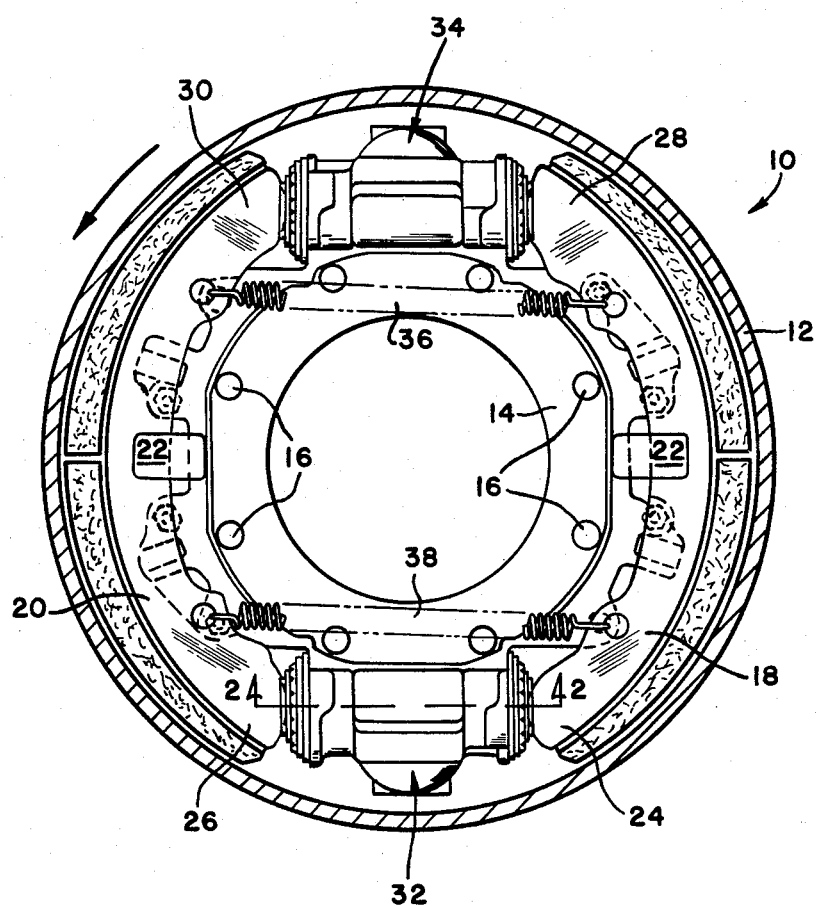
FIG. 1 is a front elevational view of a brake assembly made pursuant to the teachings of our present invention, with the drum thereof shown in cross-section.

Referring now to the drawings, a brake assembly generally indicated by the numeral 10 includes a drum 12 mounted for rotation with a member to be braked, such as the vehicle wheel (not shown). A fixed torque member or torque spider 14 is mounted to a non-rotatable portion of the vehicle adjacent the drum 12 by bolts (not shown) received through openings 16. A pair of friction elements 18, 20 are slidably mounted on the backing plate 14 for movement toward and away from braking engagement with the drum 12 and are held in place on the backing plate 14 by appropriate clips 22. The friction elements 18, 20 present opposite pairs of contiguous ends 24, 26 and 28, 30. An actuator assembly generally indicated by the numeral 32 is mounted on the backing plate 14 between the ends 24, 26 of the friction elements 18, 20 and a similar actuator assembly 34 is located between the contiguous ends 28, 30. Since the actuator assemblies 32, 34 are identical, only the actuator assembly 32 will be described herein. A pair of shoe return springs 36, 38 extend between the friction elements 18, 20 to yieldably urge the latter away from the drum 12 when the brake is released. Actuator assembly 32 includes a housing 40 defining a chamber 42 therewithin from which a tubular section 44 of the housing 40 extends. Transverse bores 46, 48 communicate with the chamber 42 and slidably receive plunger assemblies 50, 52. Plunger assemblies 50 and 52 are similar, so only the plunger assembly 50 will be described in detail. Plunger assembly 50 includes a piston 54 which is provided with a camming surface 56 on the end thereof which projects into the chamber 42. A projection 58 carried by piston 54 is slidably received in a groove 60 machined in the wall of the bore 46 to prevent rotation of the piston 54 with respect to the housing. The piston 54 carries an adjuster assembly generally indicated by the numeral 62. Adjuster assembly 62 is disclosed in U.S. Pat. No. 3,246,723 and will not be described in detail herein. However, adjuster assembly 62 includes adjuster nut 64 which threadably receives adjuster screw 66. Connected to adjuster screw 66 is adjuster screw clip 67. Adjuster screw clip 67 is slotted as at 68 to receive the web of the friction element 18 as more clearly disclosed in FIG. 2. The adjuster nut and screw assembly is received within the bore 70 defined within the piston 54. The nut 64 is provided with a serrated flange 72 which is engaged by a pawl (not shown) carried on the housing 40 adjacent the flange 72. Upon movement of the plunger assembly 50 outwardly within the bore 46 in excess of a predetermined amount, the pawl (not shown) picks up an adjacent tooth on the serrated flange 72. Thereafter, movement of the plunger assembly 50 inwardly within the bore 46 causes the nut 64 to rotate with respect to the piston 54 (which is held non-rotatable by engagement of the projection 58 and the slot 60) and with respect to the adjuster screw 66, which is held against rotation by engagement of the web of the friction element in the slot 68. Accordingly, the screw 66 is extended from the nut 64 to compensate for wear of the friction elements. An appropriate resilient boot 74 protects the bore 46 from environmental contaminants, and the boot 74 is in itself protected by a heat shield assembly generally indicated by the numeral 76. The boot 74 and heat shield assembly 76 are more completely disclosed in U.S. Pat. No. 3,592,303, issued July 13, 1971 to Tincher.

The tubular section 44 defines a bore 78 therewithin that cooperates with the chamber 42 to define a shoulder 80 therebetween. The bore 78 receives a tubular portion 82 of a fluid pressure actuator generally indicated by the numeral 84. The tubular portion 82 is threadably connected with the tubular section 44 to thereby attach the fluid pressure actuator 84 to the housing 40. The fluid pressure actuator 84 is provided with a diaphragm 86 and a push plate 87. The diaphragm 86 is responsive to fluid pressure admitted into the actuator 84 through inlet 88 to cause the push plate 87 to move upwardly viewing FIG. 2.

Figure 2:
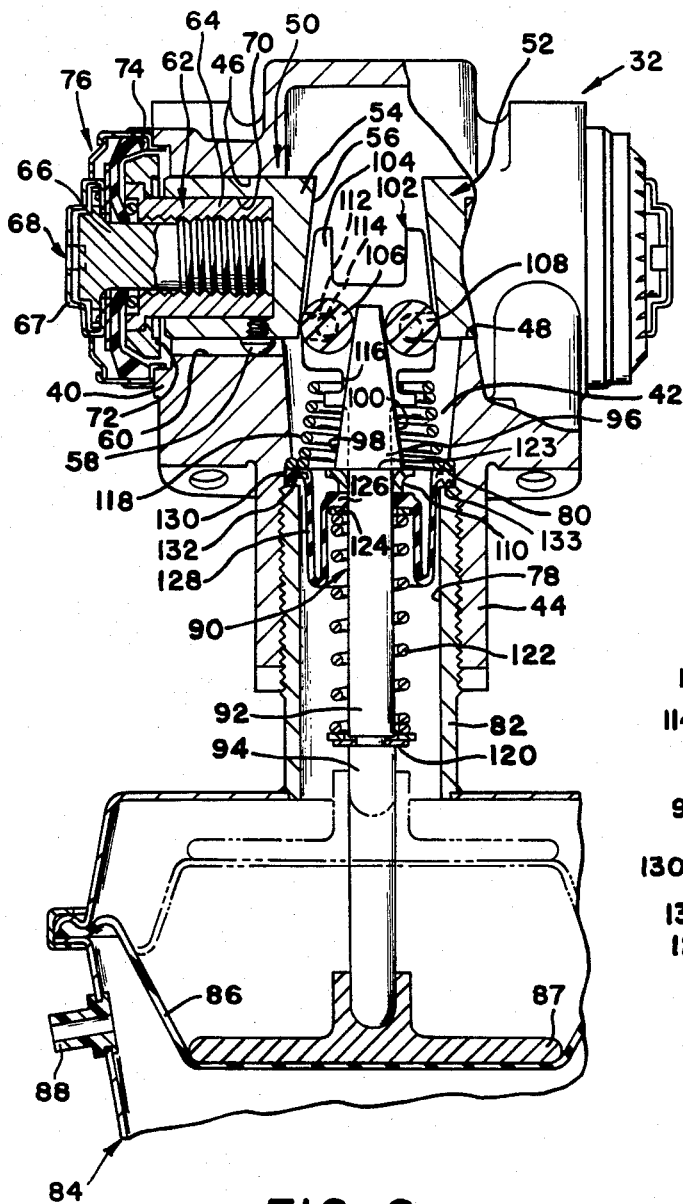
FIG. 2 is an enlarged, cross-sectional view of the actuator housing assembly used on the brake assembly illustrated in FIG. 1, taken substantially along line 2—2 of FIG. 1.

An actuating assembly generally indicated by the numeral 90 reciprocates within the bore 78 and extends into the chamber 42 between the plunger assemblies 50 and 52. Actuator assembly 90 includes a rod 92 having an input end 94 and an actuating wedge 96 at the opposite end thereof. The input end 94 of rod 92 is connected to push plate 87. The wedge 96 is provided with oppositely inclined camming faces 98, 100 on opposite sides thereof. The rod 92 carries a camming assembly generally indicated by the numeral 102, which consists of a cage 104 which carries rollers 106, 108. As indicated in FIG. 2 by dashed lines, the cage 104 extends downwardly viewing FIG. 2 and terminates in a spring seat 110. The rollers 106, 108 are provided with axles 114 which are slidably received in elongated slots 112 to permit the rollers 106, 108 to move with respect to the cage in a direction parallel to the axis of the plunger assemblies 50, 52 and at right angles to the line of travel of the actuator assembly 90.

The cage 104 is provided with a circumferentially extending groove 116 which receives one end of a conical extension spring 118. The input end 94 of the rod 92 is provided with a groove that receives a spring retainer 120 which cooperates with the spring retainer 110 to mount a compression spring 122 on the rod 92, which yieldably maintains the spring retainer 110 in engagement with the shoulder or stop 123 defined between wedge 96 and rod 92. A washer 124 bears against the upper end (viewing FIG. 2) of the spring 122, and clamps a bead 126 of a flexible, annnular boot 128 between the spring seat 110 and the washer 124. The bead 126 circumscribes the inner diameter of the boot 128. Another bead 130 having circular concentric sealing projections 131 and 132 circumscribes the outer diameter of the boot 128 and is clamped between the end 133 of the tubular section 82 of fluid pressure actuator 84 and the shoulder 80. The lowermost coil of the extension spring 118 is secured to the housing 40 by clamping against the shoulder 80, the bead 130, and the end 133 of tubular section 82.

Figure 3:
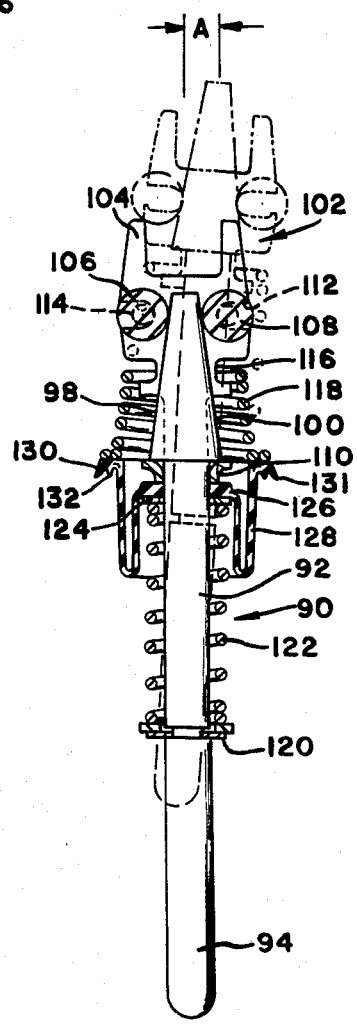
FIG. 3 is a diagramatic view of the wedge and roller cage assembly illustrating the latter in the brake released position in solid lines and in the brake applied position in phantom lines.

In operation, the various components of the brake 10 and actuator assembly 32 are illlustrated in FIG. 2 and in the solid lines in FIG. 3 in the positions which they assume when the brake is released. When a brake application is effected, fluid pressure is admitted through inlet port 88 and acts on the diaphragm 86 of fluid pressure actuator 84 to urge the rod 92 upwardly viewing FIG. 2. The camming assembly 102 moves with the rod 92 during initial movement of the rod 92 when a brake application is effected. Although extension of the extension spring 118 may tend to move the camming assembly 102 relative to the rod 92 during this initial movement, the forces generated by extension of spring 118 are counterbalanced by compression of spring 122 so that the camming assembly 102 moves with the rod 92 until the clearances between the plunger assemblies 50, 52 and the camming assembly 102 have been taken up. When this occurs, the rod 92, and therefore the wedge 96, moves relative to the camming assembly 102. The inclined faces 98, 100 of the wedge 96 force the rollers 106, 108 apart in a direction parallel to the axis of the plunger assemblies 50, 52, thereby spreading the plunger assemblies an additional increment to bring the friction elements 28, 30 into full braking engagement with the drum 10. When this occurs, the braking forces being generated are fed back through the plunger assemblies 50, 52 to the camming assembly 102, thereby halting the movement of the camming assembly 102 with respect to the plunger assemblies 50, 52.

Movement of the wedge relative to the camming assembly 102 is illustrated by the dashed lines in FIG. 3. As will be noted from FIG. 3, the actuator assembly 90 must travel for a short distance in a direction parallel to the axis of the plunger assemblies 50, 52 (as illustrated by the distance A in FIG. 3), and also must travel vertically viewing FIG. 2. The travel in the direction parallel to the axis of the plunger assemblies is necessary, as will be appreciated by those skilled in the art, because of the rotation of the shoe ring consisting of the friction elements 28 and 30 with respect to the backing plate 14 during a brake actuation. Since the compression spring 122 floats with the rod 92 when the brake is actuated, the spring 122 accommodates the necessary travel of the actuator assembly 90, both along the axis of the rod 92 and in the direction perpendicular and parallel to the plunger assemblies 50, 52. When the brake is released, the extension spring 118 pulls the actuator assembly 90 to the brake released position, and the spring 122 pulls the rod 90 with respect to the camming assembly 102 into the brake released position.

We claim:

1. Drum brake assembly comprising a drum mounted for rotation with a member to be braked, a fixed support non-rotatably mounted adjacent said drum, a pair of friction elements slidably mounted on said fixed support presenting opposite pairs of contiguous ends, and an actuator assembly between at least one of said pairs of contiguous ends of said friction elements for urging the latter into braking engagement with said drum when a brake application is effected, said actuator assembly including a housing mounted on said fixed support, a pair of pistons slidable in said housing, each of said pistons being operably connected to a corresponding one of said friction elements for urging the latter toward said drum, a force transmitting assembly movable relative to said housing and including a force transmitting member and a camming member slidable on said force transmitting member, said force transmitting assembly being movable between brake applied and brake released conditions for forcing said pistons toward a position urging said friction elements against said drum when a brake application is effected, said camming member moving with clearance between said pistons during initial movement of said force transmitting assembly, and resilient means yieldably urging said force transmitting assembly toward the brake released condition, characterized in that said resilient means includes compression spring means carried between said force transmitting member and said camming member for urging the latter toward stop means defined on said force transmitting member and for maintaining the camming member in engagement with the stop means during said initial movement of the force transmitting member, said compression spring means being movable with said force transmitting assembly, and extension spring means between the force transmitting assembly and the wall of said housing for extending or elongating from its relaxed condition as the brake is applied so that the camming member and therefore the force transmitting means are returned to the brake released position as said extension spring returns from its extended condition to its relaxed condition, the forces generated on said camming member by extension of said extension spring being counterbalanced by the forces exerted on said camming member by said compression spring during said initial movement of the force transmitting member, the force of said compression spring overcoming the force of said extension spring when said clearance between said pistons and the camming assembly has been taken up.

2. A drum brake as claimed in claim 1, further characterized in that said force transmitting member includes a rod, said camming member being slidably mounted on said rod, said compression spring means having one end mounted on the rod and the other end engaging the camming member, said compression spring collapsing to permit the force transmitting member to move relative to the camming means when the brake actuating forces applied through said pistons exceed a predetermined amount, said extension spring means acting through said camming member to oppose the force of said compression spring means thereon to thereby prevent relative movement of the camming member on the force transmitting member when the brake actuating forces applied to the pistons are below the predetermined level.

3. A drum brake as claimed in claim 2, further characterized in that said rod has an input end and a wedge at the other end, said camming member including means movable relative to said wedge along an axis parallel to the axis of movement of said pistons, whereby movement of said wedge relative to the camming member after the brake actuation forces have attained the predetermined level forces the relative movable means in opposite directions substantially parallel to said axis of the pistons, said compression spring means yieldably urging the camming member to a predetermined position on said rod when the brake is released, said extension spring means urging the rod and camming means to the brake released condition.

4. A drum brake as claimed in claim 3, further characterized in that said camming member includes rollers mounted for rotation about axes generally perpendicular to the axis of the rod and engaging a corresponding one of said pistons.

5. Actuator assembly comprising a housing, a force transmitting assembly movable in said housing between actuated and released conditions, resilient means yieldably urging the force transmitting assembly toward the released condition, a fluid pressure responsive actuator for moving said force transmitting assembly between said actuated and released conditions, said housing including a tubular section slidably receiving said force transmitting assembly, said fluid pressure actuator including a chamber having a tubular section joining the tubular section of the actuator housing, said force transmitting assembly including a rod having an input end connected to said fluid pressure actuator for movement thereby, and sealing means connected to said rod for preventing entry of contaminants into said housing around said rod, said sealing means being an annular, flexible member having inner and outer diameters, the inner diameter being secured to said rod, the outer diameter sealingly engaging said housing, the outer diameter of said flexible member being clamped between the tubular sections of said fluid pressure actuator and of said housing, a shoulder defined on the wall of one of said tubular sections, the other tubular section being received within said one tubular section to clamp said outer diameter of said sealing means between the end of said other tubular section and said shoulder, said resilient means including an extension spring, one end of said extension spring being secured to said force transmitting assembly, the other end of said spring being retained between said shoulder and said end of said other section.

6. Actuator assembly as claimed in claim 5, further characterized in that the outer diameter of said sealing means terminates in a bead, said bead having projections extending parallel to the axes of said tubular sections to accommodate variations in the clearance between said shoulder and the end of said other section.

7. Actuator assembly as claimed in claim 5, further characterized in that said force transmitting assembly further includes a camming member slidably mounted on said rod, said resilient means including compression spring means yieldably urging the camming means toward the end of the rod opposite the input end, said one end of said extension spring being secured to said camming means.

* * * * *